US012233427B2

(12) United States Patent
Nykänen et al.

(10) Patent No.: US 12,233,427 B2
(45) Date of Patent: Feb. 25, 2025

(54) REJECT CHAMBER OF A CENTRIFUGAL CLEANER AND A CENTRIFUGAL CLEANER

(71) Applicant: ANDRITZ OY, Helsinki (FI)

(72) Inventors: Antti Nykänen, Kotka (FI); Miro Partty, Kotka (FI); Jason Huff, Muncy, PA (US)

(73) Assignee: ANDRITZ OY, Helsinki (FI)

( * ) Notice: Subject to any disclaimer, the term of this patent is extended or adjusted under 35 U.S.C. 154(b) by 808 days.

(21) Appl. No.: 17/427,462

(22) PCT Filed: Jan. 30, 2020

(86) PCT No.: PCT/FI2020/050051
§ 371 (c)(1),
(2) Date: Jul. 30, 2021

(87) PCT Pub. No.: WO2020/157383
PCT Pub. Date: Aug. 6, 2020

(65) Prior Publication Data

US 2022/0126307 A1 Apr. 28, 2022

Related U.S. Application Data

(60) Provisional application No. 62/799,144, filed on Jan. 31, 2019.

(30) Foreign Application Priority Data

May 2, 2019 (FI) ..................................... 20195354

(51) Int. Cl.
*B04C 5/18* (2006.01)
*B04C 5/23* (2006.01)

(52) U.S. Cl.
CPC .................. *B04C 5/18* (2013.01); *B04C 5/23* (2013.01)

(58) Field of Classification Search
None
See application file for complete search history.

(56) References Cited

U.S. PATENT DOCUMENTS 2,927,693 A 3/1960 Freeman et al.
2,953,248 A 9/1960 Troland
(Continued)

FOREIGN PATENT DOCUMENTS

CA 885026 11/1971
CN 101717661 6/2010
(Continued)

OTHER PUBLICATIONS

Japanese Office Action with Translation cited in JP 2021 537064, mailed Oct. 24, 2023, 6 pages.
(Continued)

*Primary Examiner* — Richard C Gurtowski
(74) *Attorney, Agent, or Firm* — Nixon & Vanderhye P.C.

(57) ABSTRACT

A centrifugal cleaner with a reject chamber (1) having a center dilution arrangement (3) with a dilution nozzle (4) to deliver dilution fluid to the reject chamber (1), and a reject outlet (7) at the bottom of the reject chamber (1). The dilution nozzle (4) points outwards to create a crossing outward flow of dilution fluid across an annular space (5) around the dilution arrangement (3) to slow circulating fluid flowing down from a cone (2) of the centrifugal cleaner to the reject chamber (1). The dilution arrangement (3) may have a clearing nozzle (6), directed against the reject outlet (7). The dilution nozzle (4) may be pointed below the bottom end (9) of the cone (2) and the dilution arrangement (3) may not extend higher than the bottom end of the cone.

19 Claims, 1 Drawing Sheet

(56) References Cited

U.S. PATENT DOCUMENTS

Figure 1:
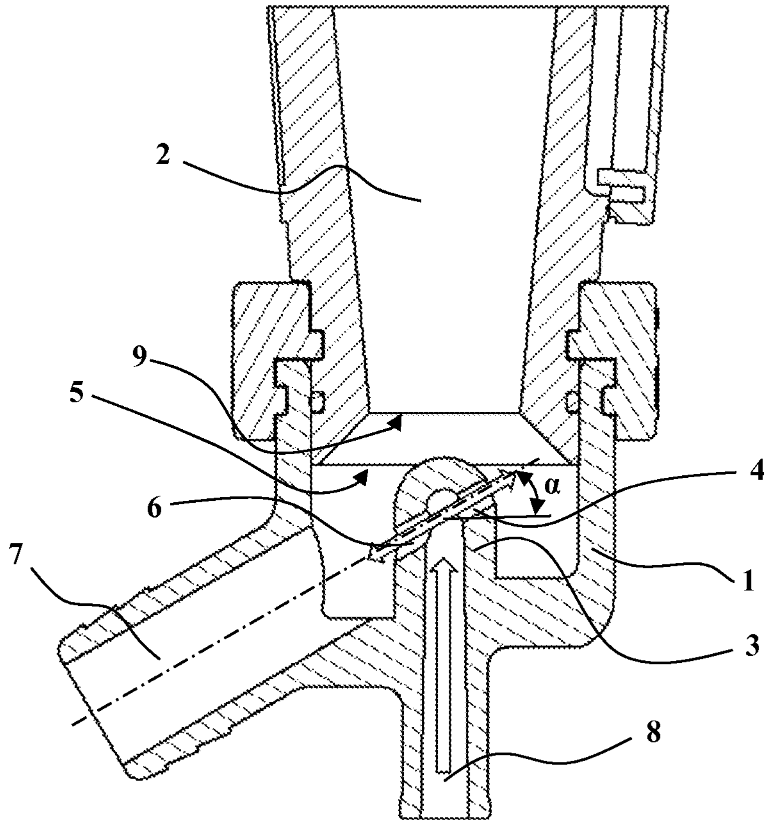

| | | | |
|---|---|---|---|
| 3,785,489 A | 1/1974 | Frykhult | |
| 4,151,083 A | 4/1979 | Dove | |
| 4,696,737 A | 9/1987 | Bouchillon | |
| 6,284,096 B1 | 9/2001 | Hartmann | |
| 2003/0059341 A1 * | 3/2003 | Gazeau ................ | G01N 35/025 422/63 |
| 2016/0129457 A1 | 5/2016 | Valentina et al. | |

FOREIGN PATENT DOCUMENTS

| | | |
|---|---|---|
| CN | 202316141 | 7/2012 |
| CN | 103201042 | 7/2013 |
| CN | 104105548 | 10/2014 |
| CN | 106573249 | 4/2017 |
| DE | 202008018358 | 5/2013 |
| EP | 1 509 331 | 3/2005 |
| EP | 1 509 531 | 3/2005 |
| EP | 3 018 252 | 5/2016 |
| GB | 693649 | 7/1953 |
| JP | 2005-527360 A | 9/2005 |
| JP | 2010-201280 A | 9/2010 |
| RU | 2588214 C2 | 6/2016 |
| SU | 1739936 A1 | 6/1992 |
| WO | 03/097650 | 11/2003 |
| WO | 03/099447 | 12/2003 |
| WO | 2012/062960 | 5/2012 |

OTHER PUBLICATIONS

Federal Institute of Industrial Property (FIIP) Office Action with Translation cited in Application No. 2021125465/04 (053786), mailed Jun. 28, 2023, 9 pages.

Federal Institute of Industrial Property (FIIP) Search Report with Translation cited in Application No. 2021125465/04 (053786), mailed Jun. 28, 2023.

Chinese Office Action cited in 202080010781.6 issued Jun. 15, 2022, 11 pages.

International Search Report for PCT/FI2020/050051 dated May 18, 2020, 5 pages.

Written Opinion of the ISA for PCT/FI2020/050051 dated May 18, 2020, 7 pages.

* cited by examiner

REJECT CHAMBER OF A CENTRIFUGAL CLEANER AND A CENTRIFUGAL CLEANER

RELATED APPLICATIONS

This application is the U.S. national phase of International Application PCT/FI2020/050051 filed Jan. 30, 2020, which designated the U.S. and claims priority to Finnish Patent Application 20195354 filed May 2, 2019, and U.S. provisional application 62/799,144 filed Jan. 31, 2019, the entire contents of each of which are hereby incorporated by reference.

SCOPE OF THE INVENTION

The invention relates to centrifugal cleaners and their reject chambers, which reject chambers have at least one dilution nozzle.

BACKGROUND OF THE INVENTION

Centrifugal cleaners like hydrocyclones are known to be diluted at their bottom areas by many different ways. CA885026 discloses a dilution flow to the reject chamber of the cleaner. U.S. Pat. No. 4,696,737 discloses a hydrocyclone, which has an additional low solids flow tangentially cocurrently applied under the cone of the cyclone. Lightest particles will flow back to the primary cyclone and to an accept outlet. U.S. Pat. No. 4,151,083 discloses a countercurrent dilution flow, which will minimize the vortex flow within a reject chamber for promoting separation efficiency of heavy impurities. U.S. Pat. No. 2,927,693 discloses a tangential cocurrent dilution feed and a tangential reject outlet for enhancing the separation. EP1509331 discloses a central dilution nozzle, which extends a central dilution arrangement up to inside the cone interior. U.S. Pat. No. 2,953,248 discloses an arrangement for temporary dilution for cleaning a reject outlet of a centrifugal cleaner. The dilution flow cyclically blows out blocking particles from the reject outlet.

SUMMARY OF THE INVENTION

Centrifugal cleaners comprises normally three main parts: A top feed part, a cone and a reject chamber. The cleaners are often arranged in tight banks, which have plenty of cleaners. Then they are often arranged so that every second cleaner has a different direction of vortex which saves space and makes arrangement of conduits easier. Thus there has to be two different bodies for the top part of the cleaner units. If the vortex should be stopped in a reject chamber by a countercurrent dilution flow, also there has to be two different sets of reject chambers. The parts will wear and they are replaced at certain intervals. Having two similar but not interchangeable parts produce confusion and errors within limited servicing schedules. A dilution nozzle which extends up to the cone of the cleaner will partially block the bottom of the cone. It will also prohibit backflow of lightest particles from the reject chamber to the accept outlet. A cleaner should be operating constantly without blockages, which will cause quality losses and capacity problems.

A new way of slowing the vortex within the reject chamber has been developed. At least one sharp dilution fluid flow is directed outwards from a central dilution arrangement across the vortex flow coming from the cone part of the cleaner to the reject chamber. The dilution flow acts like an obstacle or a stick in the vortex flow and will slow it down.

The reject chamber has a central dilution arrangement, which has at least one dilution nozzle for delivery of dilution fluid to the reject chamber and the reject chamber has a reject outlet at the bottom of the reject chamber. When the at least one dilution nozzle sprays the dilution fluid flow across the annular space below the cone of the centrifugal cleaner, the circulating motion of fluid coming from the cone of the centrifugal cleaner to the reject chamber slows down. The flow of dilution water will go to outer periphery of the reject chamber and as the vortex is slower, lightest particles are able to move to the top center of the reject chamber and then go up to the accept outlet. The slowing of the vortex also reduces the wear of the reject chamber. Hard obstacles cannot perform the slowing as the rejected particles will wear them out fast and the dilution feed cannot happen by them. When separating pulp fibers, the suspension may contain particles of filler material. By the invention, the light filler particles can be better recovered from treated suspension. As the vortex is slowed within the reject chamber and the vortex in the cone is not affected, smallest reject particles have more time to separate out of accept flow. When the dilution arrangement has also a clearing nozzle, which is directed against the reject outlet, the flow of dilution fluid will keep the reject outlet clear of rejected particles. The same central dilution arrangement can thus perform also the cleaning task and only one dilution inlet is needed. The dilution arrangement can handle both vortex directions, if one sole dilution nozzle is at the opposite side of the dilution arrangement than the clearing nozzle and/or the reject outlet. If there are several dilution nozzles, they preferably are symmetrically aligned and the plane of symmetry is defined by the center of the reject outlet and the central axis of the dilution arrangement. If the reject outlet is asymmetrically positioned to the reject chamber, then the dilution and/or the cleaner nozzles may also be asymmetrically aligned and/or positioned for optimizing the process.

When the dilution arrangement does not extend up higher than the bottom end of the cone of the centrifugal cleaner, it will not block the upflow of the lightest particles to the accept outlet. The low dilution arrangement also helps avoiding blockages of rejected particles at the entrance of the reject chamber.

The dilution nozzles are easiest to manufacture when their horizontal axis point outward to radial direction. Still especially with asymmetric dilution arrangement, a horizontal alignment of the dilution nozzles against the direction of vortex can increase the slowing effect a bit. The alignment should horizontally differ less than 45 degrees from the direction of the inside radius of the dilution arrangement.

The flow of dilution fluid from dilution nozzles should be targeted to flow below the cone of the cleaner, but the length of the flow of dilution fluid should be short to be still effective at the outermost end of the flow where the vortex is strongest. A zero degrees horizontal alignment of the dilution nozzle should normally produce the shortest distance to the wall of the reject chamber. As the dilution nozzle will be under the bottom end of the cone, it may have to be targeted upwards to have effect suitable close to the end of the cone. The vertical alignment angle should be less than 60 degrees upwards from the horizontal plane. Most preferably the vertical alignment angle should be less than 45 degrees upwards for avoiding upward flow of dilution fluid. The actual optimal angle depends on the contour of the opposite wall. When the flow hits the opposite wall, it should be diverted mostly downwards. Manufacturing of the nozzles have the widest manufacturing process options, if a dilution nozzle and the clearing nozzle have the same central axis with the reject outlet.

LIST OF DRAWINGS

Figure 2:
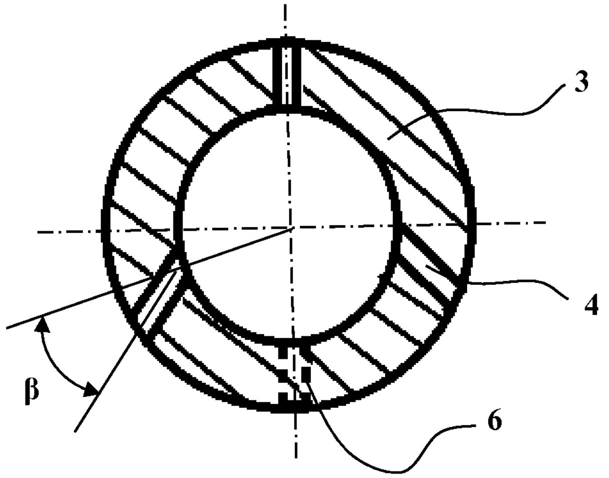

FIG. 1 illustrates vertically cut view of a bottom area of a centrifugal cleaner and FIG. 2 illustrates horizontally cut view of a dilution arrangement.

The centrifugal cleaners can be assembled in other than vertical attitudes, but in this disclosure, the mentioned orientations refer to the attached drawings.

DETAILED DESCRIPTION OF THE INVENTION

FIG. 1 illustrates cut view of a bottom area of a centrifugal cleaner. A reject chamber 1 is attached under a cone 2 of a centrifugal cleaner. On the bottom of the reject chamber 1 is a central dilution arrangement 3 and a reject outlet 7. A dilution inlet 8 leads dilution fluid into the dilution arrangement 3. A dilution nozzle 4 of the dilution arrangement 3 is aligned preferably upwards at an angle α and will accomplish a sharp outward flow of dilution fluid across an annular space 5 around the dilution arrangement 3. The dilution nozzle should be at the topmost part of the dilution arrangement 3. The bottom end 9 of the cone 2 is at the end of the conical cyclonic part, not at the lowest point of the outwards tapered end of the cone part, which will divert the dilution flow downwards and outwards. The dilution arrangement 3 can be an integral part of the reject chamber 1 or it can be an insert attached to it. The dilution arrangement 3 may not be aligned precisely at the symmetric center of the reject chamber 1. A slightly asymmetric position relative to the inner walls of the reject chamber 1 may further optimize the separation characteristics by minimizing inflow of acceptable particles to the reject outlet 7.

Preferably the dilution arrangement 3 has also a clearing nozzle 6. The clearing nozzle 6 is aligned to produce a sharp flow against a reject outlet 7. Then rejected particles will not build up a blockage on the reject outlet 7. The alignment preferably aims at the center of the reject outlet 7 but may also be aligned a bit upwards or downwards or aside of the center for optimizing the cleaning function. The dilution effect of the cleaning flow is reduced as the flow will go quite directly into the reject outlet 7. For making for example drilling and mould based manufacturing methods easier, the dilution nozzle 4 and the clearing nozzle 6 have the same central axis with the reject outlet 7. The diameters of the dilution nozzle 4 and the clearing nozzle 6 do not have to be equal and their inner shapes can be slightly tapered or have other substantially tubular shapes for optimizing properties of outflow. The clearing nozzle 6 should be at a lower level than the dilution nozzle.

FIG. 2 illustrates an embodiment of three dilution nozzles 4 with horizontal alignments having different pointing angles β. The angle β is formed between their horizontal central axis and radius R of the dilution arrangement 3. In this embodiment, the dilution nozzles 4 are arranged symmetric. The plane of symmetry is defined by the center of the reject outlet 7 and the central axis of the dilution arrangement 3. The angles β of the nozzles may also be pointed differently than illustrated in FIG. 2, for example against a specified vortex direction and to other vertical alignments.

The invention claimed is:

1. A reject chamber assembly configured to releasably attached to a centrifugal cleaner, the reject chamber assembly comprising:

a reject chamber below a lower region of an inverted cone of the centrifugal cleaner and the reject chamber is configured to receive rejects from a flow moving through the inverted cone;

a dilution arrangement at a center of the reject chamber, wherein the dilution arrangement includes at least one dilution nozzle below the inverted cone and the at least one dilution nozzle is configured to discharge dilution fluid directly into the reject chamber; and a reject outlet at a bottom of the reject chamber;

wherein the at least one dilution nozzle points outwards of the dilution arrangement and is configured to discharge a crossing outward flow of a dilution fluid directly into and across an annular space around the dilution arrangement and in the reject chamber, wherein the discharge from the at least one dilution nozzle slows circulating motion of fluid flowing down from the inverted cone of the centrifugal cleaner to the reject chamber.

2. The reject chamber assembly of claim 1, wherein the dilution arrangement includes a clearing nozzle below the inverted cone and the clearing nozzle is configured to discharge the dilution fluid towards the reject outlet to keep the reject outlet clear of rejected particles.

3. The reject chamber assembly of claim 2, wherein the at least one dilution nozzle includes a dilution nozzle at an opposite side of the dilution arrangement from the cleaner nozzle.

4. The reject chamber assembly of claim 1, wherein the at least one dilution nozzle includes dilution nozzles arranged symmetrically relative to a plane of symmetry defined by a center axis of the reject outlet and a central axis of the dilution arrangement.

5. The reject chamber assembly of claim 1, wherein the at least one dilution nozzle includes dilution nozzles aligned horizontally and angles between adjacent ones of the dilution nozzles differ by less than 45 degrees from a direction of an inside radius of the dilution arrangement.

6. The reject chamber assembly of claim 1, wherein the at least one dilution nozzle points upwards at an angle of no more than 60 degrees from a horizontal plane.

7. The reject chamber assembly of claim 6, wherein that the at least one dilution nozzle points upward by no more than 45 degrees from the horizontal plane.

8. The reject chamber assembly of claim 2, wherein the at least one dilution nozzle includes a dilution nozzle, wherein the dilution nozzle and the clearing nozzle are aligned with a center axis of the reject outlet.

9. The reject chamber assembly of claim 1, wherein the dilution arrangement is positioned asymmetrically relative to an inner wall of the reject chamber.

10. The reject chamber assembly of claim 1, wherein the at least one dilution nozzle points upward towards a bottom end of the inverted cone.

11. The rejected chamber assembly of claim 10, wherein the at least one dilution nozzle of the dilution arrangement is no higher than the bottom of the inverted cone of the centrifugal cleaner.

12. A centrifugal cleaner assembly comprising:

a centrifugal cleaner including an inverted conical chamber; and a reject chamber assembly removably attached to a lower region of the centrifugal cleaner, wherein the reject chamber assembly includes:

a reject chamber at least partially below the inverted conical chamber configured to receive rejects from a flow moving through the inverted conical centrifugal cleaner;

a dilution channel extending into the reject chamber, wherein the dilution channel includes a flow path configured to receive a dilution liquid and nozzles below the inverted conical chamber, wherein the nozzles are configured to discharge the dilution liquid from the flow path directly into an annular space within the reject chamber, wherein the annular space is below the inverted conical chamber and formed between at least one outer wall of the dilution channel and at least one inner wall of the reject chamber; and a reject outlet extending from a lower region of the reject chamber, wherein the nozzles include at least one upwardly oriented dilution nozzle configured to discharge the dilution fluid directly into the annular space at an upward angle with respect to a horizontal plane.

13. The centrifugal cleaner assembly of claim 12, wherein:

the reject outlet has a center axis angled downwardly relative to the horizontal plane, and the at least one upwardly oriented dilution nozzle includes a first dilution nozzle aligned with the center axis of the reject outlet.

14. The centrifugal cleaner assembly of claim 12, wherein the at least one upwardly oriented dilution nozzle is a plurality of upwardly oriented dilution nozzles, wherein the plurality of upwardly oriented dilution nozzles are each offset at opposite horizontal angles from a line in the original plane aligned with an axis of the reject outlet.

15. The centrifugal cleaner assembly of claim 12, wherein the at least one upwardly oriented dilution nozzle is a single upwardly oriented dilution nozzle having an axis aligned with the center axis of the reject outlet.

16. The centrifugal cleaner assembly of claim 14, wherein the each of the plurality of upwardly oriented dilution nozzles each have a respective axis which is not aligned with a radius from a vertical axis of the dilution channel.

17. The centrifugal cleaner assembly of claim 12, wherein the nozzles include a clearing nozzle oriented to discharge the dilution fluid towards an inlet of the reject outlet and at a downward angle with respect to the horizontal plane.

18. The centrifugal cleaner assembly of claim 15, wherein the nozzles include a clearing nozzle arranged to direct the dilution liquid downward towards the reject outlet, wherein the upward oriented dilution nozzle is at an opposite side of the dilution arrangement from the cleaner nozzle.

19. The centrifugal cleaner assembly of claim 12, wherein an upper end of the dilution channel is at or below a bottom end of the centrifugal cleaner.

* * * * *